Sept. 3, 1946.   H. T. LAMBERT   2,407,022
MULTIPLE DISK ENERGIZING CLUTCH
Filed Oct. 30, 1944   3 Sheets-Sheet 3
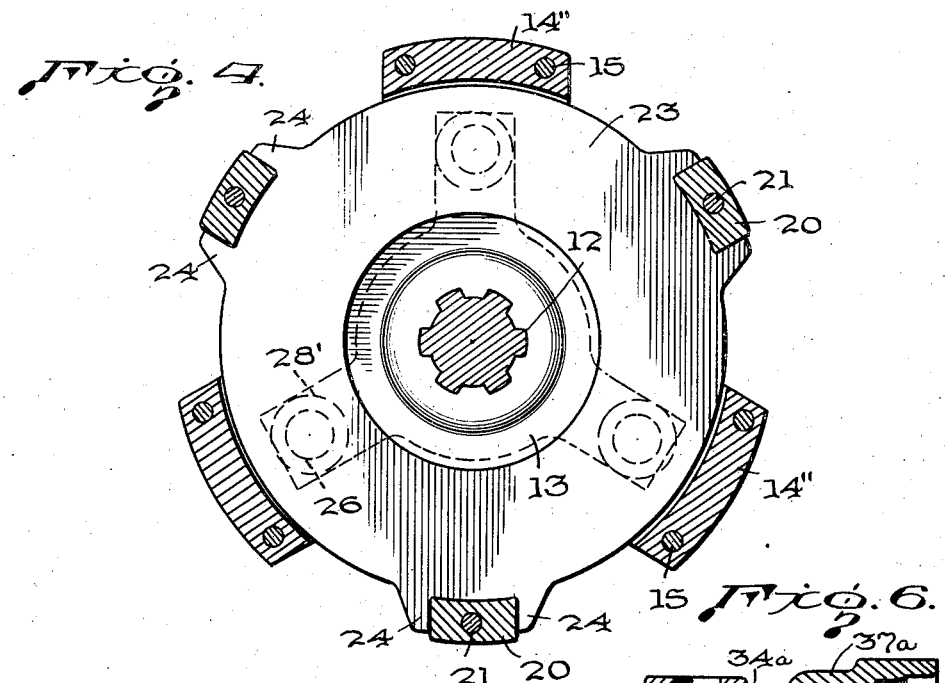
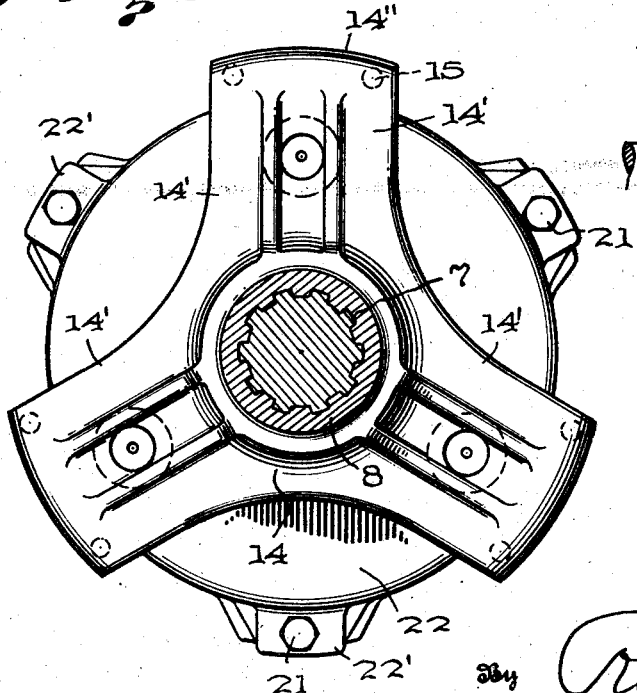
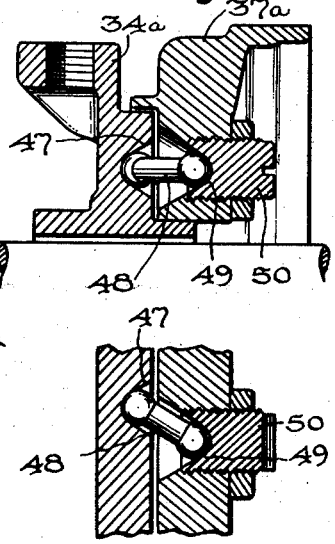
Inventor
H. T. Lambert
By Robert Robb
Attorneys Patented Sept. 3, 1946

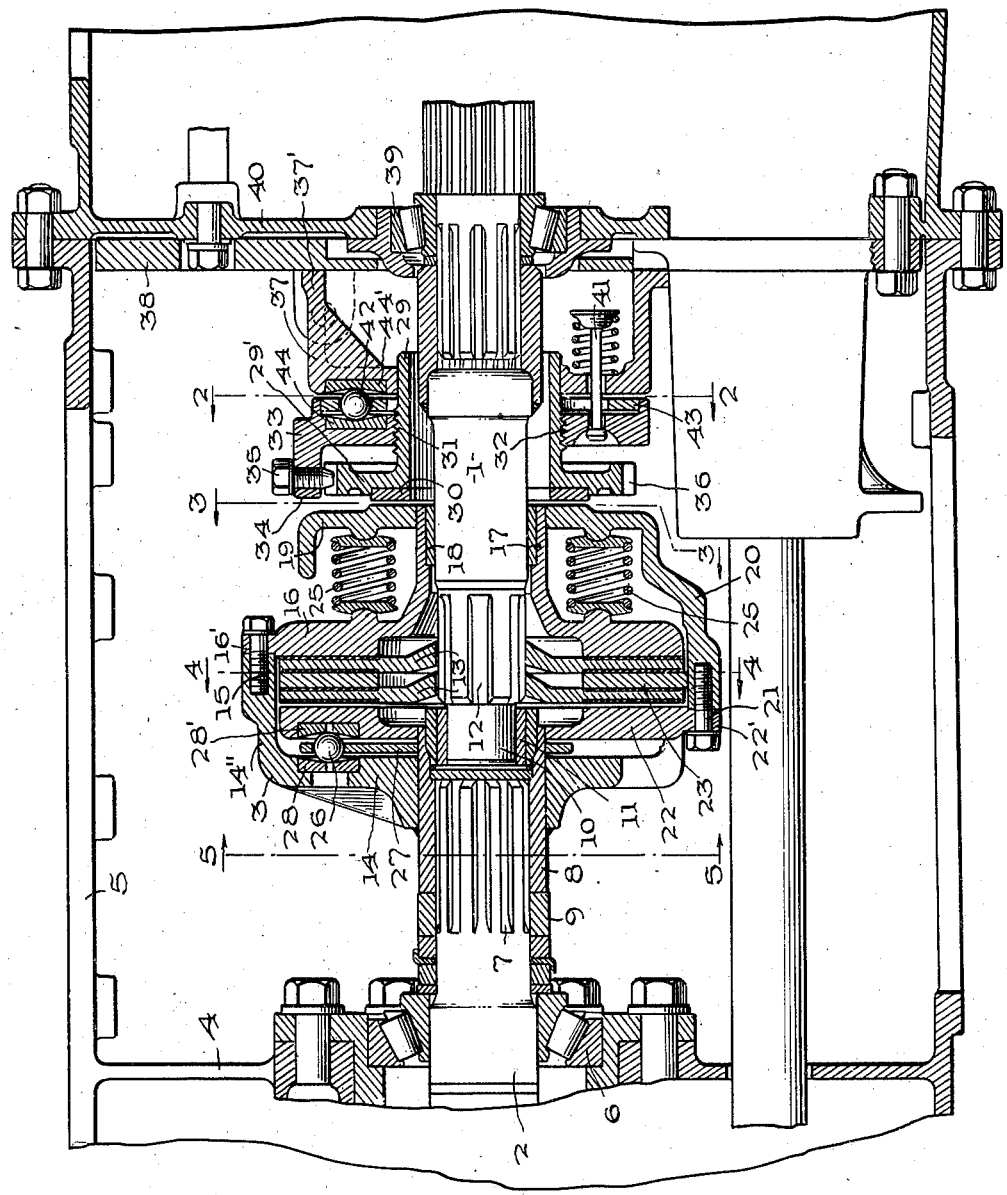

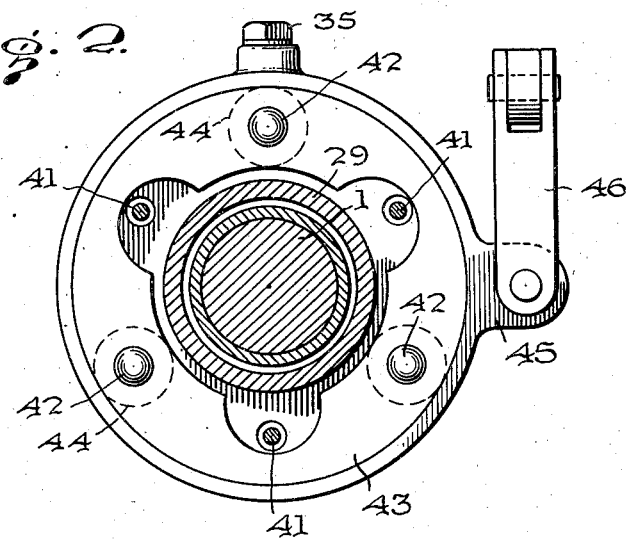
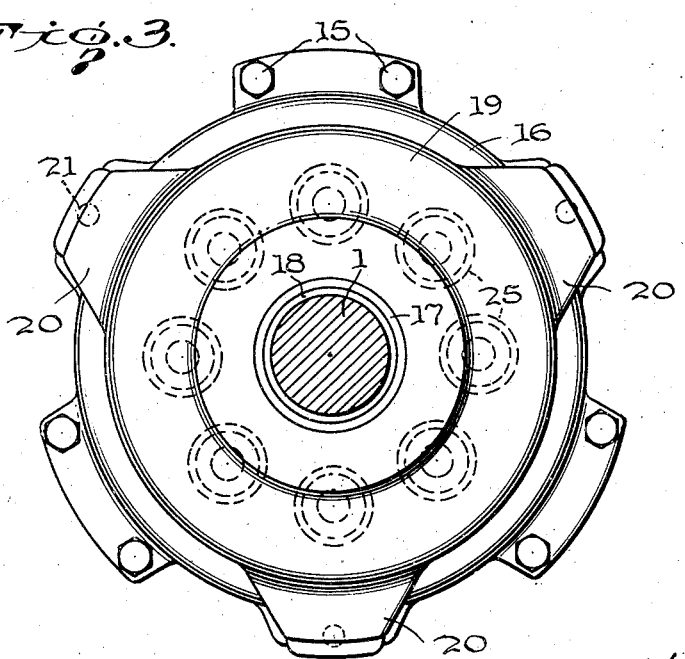

2,407,022

UNITED STATES PATENT OFFICE 2,407,022

MULTIPLE DISK ENERGIZING CLUTCH

Homer T. Lambert, St. Joseph, Mich., assignor to Lambert Brake Corporation, St. Joseph, Mich., a corporation of Michigan Application October 30, 1944, Serial No. 561,128

8 Claims. (Cl. 192—54)

The present invention relates to improvements in power clutches of the type disclosed herein designed for use in automotive vehicles. The mechanism of this design provides for the utilization of a plurality of friction elements in the form of disks to produce the required torque to obtain a predetermined force or speed of any mechanism to do certain work with greater efficiency and less effort.

More specifically, the arrangement and construction is such that one may employ two or more friction elements to provide sufficient friction, depending upon the work to be performed, without modification of the general structure, it being only necessary, after calculation of the force effect, to multiply the number of clutch disk units to arrive at the power to be used for any particular work to be done. To this end, the invention primarily contemplates the utilization of a plurality of friction disks intermediate the primary and secondary disks suitable to increase the surface area of friction of the clutch elements according to the power desired of the clutch effort to be produced.

Accordingly, one of the primary objects of this invention is to provide a clutch unit of approximately one-half the size of the conventional type of clutches now in use for a particular job. Consequently, the space required for the mechanism is much smaller for application and operation, and it further permits of the use of either a dry clutch or one operating in an oil bath, with less unit pressure or effort. When utilizing an oil bath, it is obvious that the mechanism will last without replacements almost indefinitely.

Another object is to provide a distinct improvement in power delivery with approximately half the size and weight of the present conventional clutches in use for the same purposes at the present time.

Thus, the primary advantage derived by the invention, when operated as above stated with an oil bath, resides in the reduction of wear and destruction to the minimum, but in the first order of importance the smaller size clutch enables the use of a smaller size housing than at present in use, with an accompanying material reduction in cost of metal and labor. It is quite well known in this connection, that in present passenger automobiles, buses, and trucks, the clutch housing is, and has always been, in the way of the floor boards, making it necessary to provide a hump protruding above the floor level, but in my construction, due to the reduction in size possible with this invention, this protrusion and obstruction is entirely eliminated and a more streamline fit and construction in the first instance of appurtenances may be had at considerably less cost.

Several additional advantages are derived from the use of a smaller size clutch, such as the reduction of vibration due to the smaller diameter of the unit and decrease in weight. In the use of an oil bath for this small size clutch unit, there is also a reduction to minimum of fatigue of the operator, since less spring pressure is required than in dry clutches, and all parts being lubricated, friction of operating parts and accompanying heat are practically eliminated.

Other and further objects and advantages of the invention will be hereinafter described, and the novel features thereof defined by the appended claims.

In the drawings:

Figure 1 is a horizontal sectional view showing the details of construction of my new clutch, together with the operating mechanism therefor and the housing in which these mechanisms are enclosed for splash lubrication;

Figures 2, 3, 4, and 5 are transverse sectional views on the respective lines 2—2, 3—3, 4—4, and 5—5 of Figure 1; and Figures 6 and 7 are fragmentary sectional views of modifications of the adjusting means for taking up wear in the clutch release mechanism.

Like reference characters designate corresponding parts in the several figures of the drawings.

Referring particularly to Figure 1 of the drawings, the clutch mechanism of this invention will first be described, it being understood that this mechanism is intended to be applicable to any construction where power and speed are transferred from a driving to a driven shaft. In the present instance, I designates the driving shaft, 2 the driven shaft, and 3 the intermediate clutch mechanism. To provide for the mounting of the clutch, the driven shaft is journalled in the transverse wall 4 of the housing 5 in the bearing 6, the terminus of said shaft being splined, as indicated at 7, and carrying the splined bearing sleeve 8 and spacer collar 9.

The driving shaft I is formed with a pilot bearing 10 at its extremity fitted into the sleeve 8 by means of the adapter bushing 11. Adjacent the pilot bearing, this shaft is provided with a spline section 12 upon which the spaced rotary friction disks 13 are slidingly received. It is to be noted at this point that, while I have illustrated two of such disks, any number of the same may be employed, depending upon the particular power or work to be performed by the clutch in a given application of the mechanism. Motion of the driving shaft 1 is imparted by these disks to the driven shaft through the clutch mechanism of which said disks form a part.

Fixedly secured upon the sleeve 8 is what I term, for the purposes of this description, the power or energizer plate 14, in form, more clearly shown in elevation in Figure 5, composed of three radial rib-reinforced arms 14', each having a horizontal extension 14", bored and threaded to receive a pair of clamping bolts or screws 15. These screws pass through openings in the peripheral extensions 16' of the secondary disk or plate 16. Centrally this plate is formed with a sleeve 17, concentric with and having a bearing at 18 on the driving shaft 1.

Upon the extremity of the sleeve 17 is rotatably and slidably mounted the spring housing 19, having spaced arms 20 disposed between the extensions 14", and each bored and threaded to receive a pair of clamping bolts or screws 21 which pass through openings in peripheral extensions 22' of the primary disk 22. This primary, rotatable disk is journalled upon the end of the splined sleeve 8.

The primary disk, therefore, is disposed in contiguous relation to one of the rotary disks 13, while in opposed relation the secondary disk 16 is disposed in contiguous relation to the other rotary disk 13 hereinbefore referred to. To increase the friction surface of the clutch, I mount between these two rotary disks, or between every pair of such disks employed, an intermediate friction disk 23. As will be seen in Figure 4, the intermediate disk 23 is formed at intervals about its periphery with pairs of lugs 24 to engage about and interlock with the extensions 22' of the primary disk, so that the intermediate disk rotates only when the clutch is engaged, but serves to multiply the frictional grip of the clutch upon the rotary disks 13 when thus engaged.

The clutch action is primarily produced by an annular arrangement of expansion, coiled springs 25 interposed between the housing 19 and the secondary plate 16, but to obtain maximum clutch action, I prefer to use the energizing feature of roller or ball and camming surfaces between the primary disk 22 and the power plate 14, whereby in combination with the multiple disk friction area, a powerful clutch application is produced notwithstanding the reduction in overall size of the unit and the use of an oil bath therefor, as hereinafter described. In the drawings, 26 designates balls in the retainer ring 27, and 28, 28' the respective complementary camming disks.

It is to be understood that a suitable quantity of oil is contained in the housing 5 so that as the clutch unit is rotated the parts are all well lubricated and wear and tear reduced to the absolute minimum.

Control of this clutch mechanism is had by means of the operating unit which will now be specifically described. This operating unit is composed of an adjusting hub 29, the flange 29' of which has seated in its inner face a thrust washer 30 located in contiguous relation to the spring housing 19, but slightly spaced therefrom when the clutch is in engaged position. The outer hub surface is threaded, as at 31, to adjustably receive the internal threads 32 of an actuator disk 33 which is provided with a laterally extending lug 34 through which extends a lock screw 35. The end of this screw interlocks with peripheral teeth 36 on the hub flange. This construction permits adjustment to be readily made as wear takes place in the operating parts of this unit and in initial adjustment of parts.

Next adjacent the hub is arranged the backing or power disk 37 in which the hub is journalled and slidingly mounted. The annular sleeve or collar extension 37' of the power disk bears against the plate 38 surrounding the bearing 39 of the driving shaft 1 in the transverse wall 40 of the housing 5.

A series of spring tensioned bolts 41 extend through the power disk 37 and the actuator disk tending normally to hold the latter with its adjusting hub to the power disk. Between the actuator disk 33 and the power disk 37 are arranged a series of balls 42 mounted in a retainer 43 carried by the actuator disk, and these balls coact with camming disks 44, 44' seated in the faces of the actuating and power disks, respectively.

As shown in Figure 2, the actuator disk 33 is formed with a lug 45 to which a clutch lever (not shown) is connected by a link 46.

I desire it to be understood that the foregoing describes only one form of actuator unit for my clutch, other types being equally applicable as will be understood by those skilled in the art. For example, the energizing balls or rollers in this unit may be replaced by toggle links or pins, as shown in detail in Figures 6 and 7. Referring to these figures, it will be noted that the actuator disk 34a is provided with a plurality of depressions or recesses 47 each to receive the ball extremity of a toggle pin 48, the other similarly shaped ends of the pins seating in corresponding depressions 49 formed in the ends of an adjusting screw 50, there being one such adjusting screw for each toggle pin employed. These screws are mounted in the power disk 37a surrounding the driving shaft. Figure 7 illustrates the position assumed by the pin when the actuator disk has been shifted by the clutch lever.

Having in view the foregoing description, the operation of the clutch and release thereof will now be described. The position of the clutch elements shown in Figure 1 of the drawings represents the normal clutch disengaged position. When the clutch is applied by the operation of the actuator mechanism, the spring housing 19 shifts on the hub 17 of the secondary disk toward the right, said housing carrying with it the primary plate 22, causing engagement of the friction face thereof with the rotating disk 13 next adjacent the primary disk. The rotation of the disk 13 is picked up by the primary disk and causes the balls 26 to climb up the inclined planes of the camming disks 28, 28', which immediately imparts additional axial movement to the primary disk, causing the friction face of the first-mentioned rotary disk 13 to engage the friction face of the intermediate disk 23, then contact with the second rotary disk 13, which is followed by contact of the latter with the secondary plate or disk 16. This servo action, therefore, produces a powerful frictional engagement of the parts in the order named and causes the driven shaft to take up the rotary movement from the energizer plate 14. When the clutch is to be released, the actuator disk 33 is rotated by the clutch-controlled lever through the link 46, thereby causing the balls 42 of the actuator unit to climb the camming surfaces of the disks 44, 44', which results in the movement of the adjusting hub 29 and thrust washer 30 to the left, causing compression of the springs 25 of the clutch. The drag imposed upon the spring housing by the frictional contact of the thrust collar therewith immediately releases the balls 26, allowing them to roll to the base of the cams and the consequent movement of the primary disk away from the first rotary disk 13. The driven shaft, by virtue of this release operation, no longer takes the drive from the driving shaft.

It will be recognized that this form of release operating mechanism requires a minimum amount of effort on the part of the operator of the clutch, and the employment in the clutch mechanism of the servo form of camming action insures a positive and powerful clutch for the reduced size thereof as compared with the clutch devices employed for corresponding purposes at the present time.

Other changes and adaptations of the invention may be made without departing from the spirit thereof as defined by the appended claims.

I claim:

1. Clutch mechanism of the class described comprising a driving shaft, a driven member, a rotary disk carried by said driving shaft, a primary disk contiguous to said rotary disk, a relatively stationary secondary plate journalled on said driving shaft at one side of said disks, a power plate secured to the driven member at the opposite side of said disks and connected to the secondary plate, and spring-actuated means coacting with said secondary plate and fixedly connected with the primary disk for effecting frictional engagement of the primary disk with the rotary disk to operate the driven member from said driving shaft through the power plate.

2. Clutch mechanism of the class described comprising a driving shaft, a driven member, a rotary disk carried by said driving shaft, a primary disk contiguous to said rotary disk, a relatively stationary secondary plate journalled on said driving shaft at one side of said disks, a power plate secured to the driven member at the opposite side of said disks and connected to the secondary plate, spring-actuated means coacting with said secondary plate and fixedly connected with the primary disk for effecting frictional engagement of the primary disc with the rotary disk to operate the driven member from said driving shaft through the power plate, and camming means arranged intermediate the primary disk and power plate rendered effective as the primary disk picks up rotation from the rotary disk for shifting said primary disk axially toward the rotary disk to augment the frictional engagement of said primary disk with the rotary disk.

3. Clutch mechanism of the class described comprising a driving shaft, a driven member, a rotary disk slidably mounted on said shaft, a primary disk mounted at one side of the rotary disk, a secondary plate mounted at the other side of said rotary disk and connected to a member secured to the driven member, a spring housing adjacent the secondary plate and connected to the primary disk, springs intermediate the secondary plate and the housing for urging the primary disk into contact with the rotary disk and thereby effect rotation of the driven member, and energizing means operable on the primary disk incident to rotation thereof by the rotary disk to increase the frictional engagement between the primary and rotary disks.

4. Clutch mechanism of the class described comprising driving and driven shafts, spaced rotary disks splined to the driving shaft, a relatively stationary secondary plate having a bearing extension journalled on said driving shaft, a primary disk slidably and rotatably mounted at one side of the rotary disks, spring-actuated means connected to the primary disk for urging said disk into engagement with one of said rotary disks, a friction disk mounted intermediate the rotary disks and operatively connected with the primary disk, and springs for said actuated means, said intermediate disk increasing the area of frictional engagement between the relatively stationary driven parts and the driving parts aforesaid.

5. Clutch mechanism of the class described comprising driving and driven shafts, spaced rotary disks splined to the driving shaft, a relatively stationary secondary plate having a bearing extension journalled on said driving shaft, a primary disk slidably and rotatably mounted at one side of the rotary disks, spring-actuated means connected to the primary disk for urging said disk into engagement with one of said rotary disks, a friction disk mounted intermediate the rotary disks and operatively connected with the primary disk, and springs for said actuated means, said intermediate disk increasing the area of frictional engagement between the relatively stationary driven parts and the driving parts aforesaid, and energizing means operative upon engagement of the primary, rotary and intermediate disks to increase the effective clamping together of the said disks.

6. Clutch mechanism of the class described comprising a driving shaft, a driven shaft, a rotary disk secured to the driving shaft for rotation therewith and slidable axially thereof, a primary disk having spaced peripheral lugs extending therefrom, a power plate carried by the driven shaft and also having spaced peripheral lugs, a secondary plate on the opposite side of the rotary disk from the primary disk, cap screws connecting the secondary plate with the lugs of the power plate, a spring housing having spaced peripheral lugs connected to the primary disk by cap screws, springs between the housing and the secondary plate to effect clutch engagement, and clutch operating means mounted at one side of the clutch and operable to shift the spring housing to thereby compress the springs and displace the primary disk from engagement with the rotary disk.

7. Clutch mechanism of the class described comprising a driving shaft, a driven member, a rotary disk carried by said driving shaft, a primary disc contiguous to said rotary disk, a relatively stationary secondary plate journalled on said driving shaft at one side of said disks, a power plate secured to the driven member at the opposite side of said disks and connected to the secondary plate, spring-actuated means coacting with said secondary plate for effecting frictional engagement of the primary disk with the rotary disk to operate the driven member from said driving shaft through the power plate, and operating means for effecting disengagement of the primary disk from the rotary disk comprising a thrust washer engageable with the spring-actuated means, an actuator disk, means for rotating said actuator disk, and means for shifting said actuator disk and thrust washer upon rotation of the former.

8. A clutch and operating means therefor as set forth in claim 7, combined with adjusting means on the actuator disk for adjusting the position of the thrust washer relative to the clutch spring-actuated means.

HOMER T. LAMBERT.